J. H. RICHARDSON & W. J. TAYLOR.
Cork-Extractor.
No. 206,134. Patented July 16, 1878.
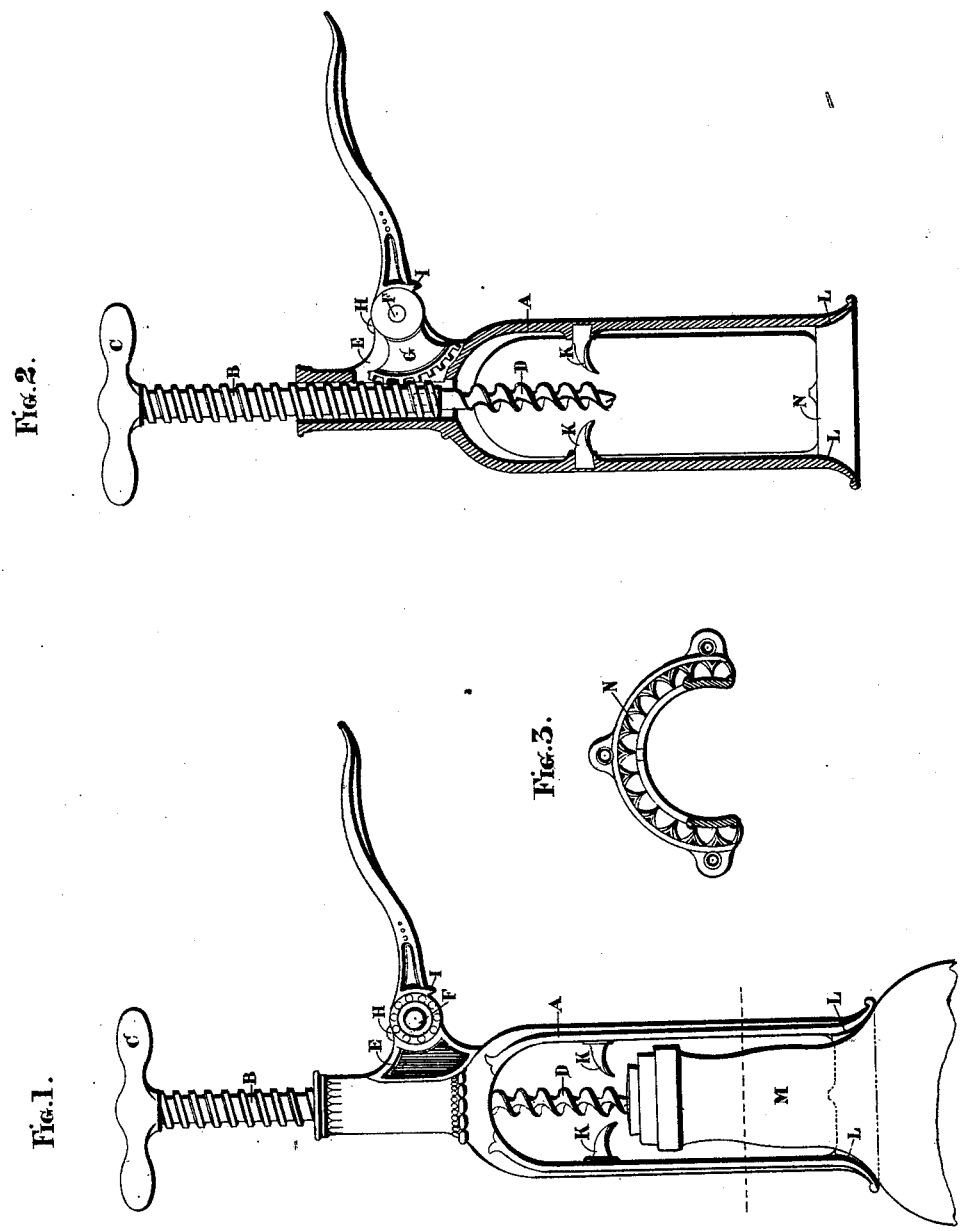

UNITED STATES PATENT OFFICE.

JOHN H. RICHARDSON AND WILLIAM J. TAYLOR, OF MARINETTE, WIS.

IMPROVEMENT IN CORK-EXTRACTORS.

Specification forming part of Letters Patent No. 206,131, dated July 16, 1878; application filed April 13, 1878.

*To all whom it may concern:*

Be it known that we, JOHN H. RICHARDSON and WILLIAM J. TAYLOR, of Marinette, in the county of Oconto and State of Wisconsin, have invented certain new and useful Improvements on Cork-Extractors; and we do hereby declare the following to be a full, clear, and exact description thereof, reference being had to the accompanying drawing, and to the letters of reference marked thereon.

The nature of our invention consists in certain improvements in devices for extracting corks from bottles, as will be hereinafter more fully set forth.

In the annexed drawing, which fully illustrates our invention, and to which reference is made, Figure 1 is a side elevation of our invention. Fig. 2 is a vertical section of the same. Fig. 3 is a cross-section through the line $x\ x$.

M represents the neck of a bottle with cork therein to be extracted. Over this neck is placed a casing or hollow standard, A, made of any suitable material, and contracted at the upper end to receive the screw B, having a handle, c, attached at its upper end, and at the lower end it is provided with a screw or worm, D, tapped and screwed in position. On the outside of the casing A are formed two ears or jaws, E, between which, by means of a pin, F, is pivoted a toothed segment, G, having a suitable projecting handle or lever, as shown.

H is an upper stop, to prevent the lever from rising above a certain point, and I is a lower stop, to prevent the lever from traveling far enough to throw the segment G out of gear with the screw B.

Inside of the casing are permanently attached two or more sharpened steel hooks or knives, K K, at such a point as to be above the cork when the extractor is placed in position on the bottle.

The lower end of the casing A is made flaring, and provided on the inner side with packing L, of rubber, leather, or other suitable material, for the purpose of causing the casing to accommodate itself to the bottle and prevent breaking the same.

The casing A is placed over the neck M of the bottle or other vessel, with the screw B and segment-lever G in the position shown in the drawing. By now turning the handle C, the screw D will enter the cork with ease, owing to the leverage gained by means of the toothed segment acting as a nut. When the screw D has been sufficiently inserted, the lever G is forced down, which necessarily withdraws the cork, and the cork is at the same time split, cut, or torn asunder, so that it is forced off the screw D by aid of the knives or hooks K K.

The device may be used by hand, when the half-circle N of the bell-mouth may be continued around, forming a circle; or it may be used fixed to a table, bench, or counter by means of screws, as shown in Fig. 3, or by means of a flange on the bottom or side. In either case the action and effect of the device will be the same.

Having thus fully described our invention, what we claim as new, and desire to secure by Letters Patent, is—

1. The casing A, having its lower end made flaring, and provided with packing L, in combination with cork-extracting devices applied thereto, for the purposes herein set forth.

2. The combination of the casing A, screw B, with worm D, and the toothed segmental lever G, substantially as and for the purposes herein set forth.

3. The knives or hooks K K, in combination with the casing A and the screw or worm D, for the purposes herein set forth.

JOHN H. RICHARDSON.
WILLIAM J. TAYLOR.

Witnesses:
JOHN J. SHERMAN,
GEORGE CLARK.